(12) United States Patent
Cohen

(10) Patent No.: US 8,185,563 B2
(45) Date of Patent: May 22, 2012

(54) DATA-VISUALIZATION SYSTEM AND METHOD

(75) Inventor: Jonathan Cohen, Mercer Island, WA (US)

(73) Assignee: Jonathan Cohen, Mercer Island, WA (US)

( * ) Notice: Subject to any disclaimer, the term of this patent is extended or adjusted under 35 U.S.C. 154(b) by 149 days.

(21) Appl. No.: 12/815,290

(22) Filed: Jun. 14, 2010

(65) Prior Publication Data

US 2010/0318583 A1 Dec. 16, 2010

Related U.S. Application Data

(60) Provisional application No. 61/187,584, filed on Jun. 16, 2009, provisional application No. 61/226,430, filed on Jul. 17, 2009.

(51) Int. Cl.
*G06F 17/30* (2006.01)

(52) U.S. Cl. .................................................. 707/805

(58) Field of Classification Search .................. 707/600, 707/608, 609, 705, 790, 805, 809, E17.065, 707/E17.082, E17.093, E17.121
See application file for complete search history.

(56) References Cited

U.S. PATENT DOCUMENTS

| 6,208,985 | B1 | 3/2001 | Krehel |
| 2003/0055830 | A1 | 3/2003 | Gutierrez-Rivas et al. |
| 2005/0021538 | A1 | 1/2005 | Meyers et al. |
| 2005/0256852 | A1 | 11/2005 | McNall et al. |
| 2009/0063213 | A1* | 3/2009 | Benayon et al. .............. 705/7 |

OTHER PUBLICATIONS

Sugibuch et al, Integrated Framework for the Visualization of Relational Databases and Related Web Content, 2003 IEEE, pp. 197-201.*
Andrade et al, Scheduling Multiple Data Visualization QueryWorkloads on a Shared Memory Machine, 2002 IEEE, pp. 1-8.*
Kichiyosh et al, Data Visualization for Supporting Query-Based Data Mining, 1999 IEEE, pp. V-888-V-893.*

* cited by examiner

*Primary Examiner* — Fred I Ehichioya
(74) *Attorney, Agent, or Firm* — Æon Law; Adam L. K. Philipp

(57) ABSTRACT

A data visualization system and method are provided herein.

18 Claims, 13 Drawing Sheets

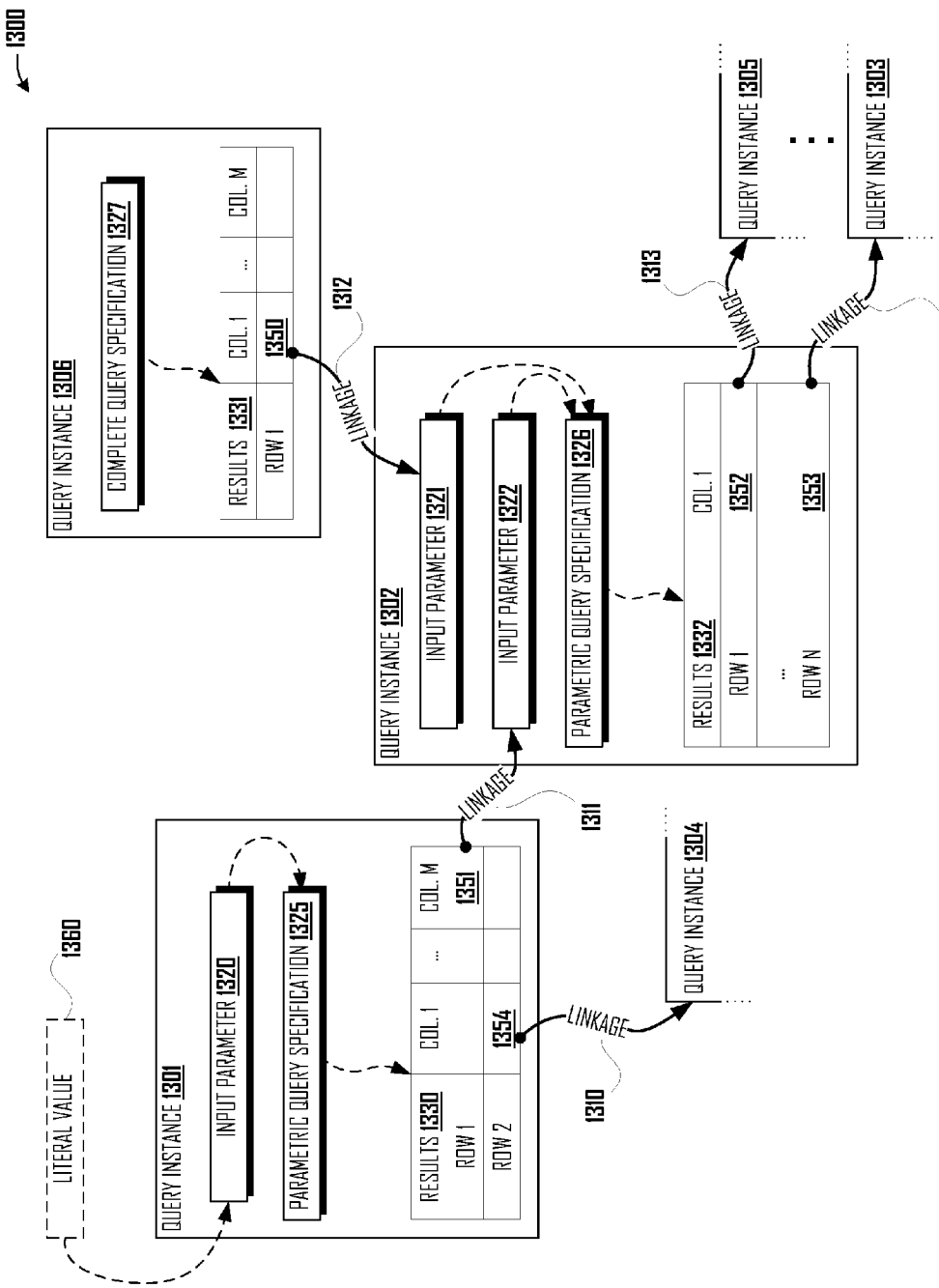

DATA-VISUALIZATION SYSTEM AND METHOD

CROSS REFERENCE TO RELATED APPLICATIONS

This application claims the benefit of priority to Provisional Application No. 61/187,584, filed Jun. 16, 2009, titled "Data Visualization System and Method," and naming inventor Jonathan Cohen. This application also claims the benefit of priority to Provisional Application No. 61/226,430, filed Jul. 17, 2009, titled "Heirarchical Diagram System and Method," and naming inventor Jonathan Cohen. The above-cited applications are incorporated herein by reference in their entireties, for all purposes.

Provisional Application No. 61/226,430, mentioned above, is also included as Appendix A to this application. Appendix A discloses systems and methods for constructing diagrams of deeply hierarchical data such as may be used to implement one embodiment of the data visualization system disclosed herein.

FIELD

The present disclosure relates to electronic databases, and, more particularly, to systems and methods for visualizing relationships among data in a database.

BACKGROUND

People often want to select, view, and/or interact with data in a database in a visual, structured manner. Various programs, such as Microsoft Excel, from Microsoft Corporation of Redmond Wash., allow a user to show data in a statistical manner, but that type of graph does not allow the viewer to see the structure of the data within the database.

In other cases, the visualization does show the structure, but in a relatively flat way. For example, the data visualization tool Many Eyes, provided by International Business Machines Corporation of Armonk N.Y., provides several types of visualizations, including a "network diagram," which depicts an interconnected graph of nodes. For another example, the graphing tool Gruff, provided by Franz Inc. of Oakland, Calif., allows a user to enter a standard, complete textual query and place the results in a graph. The user can click on a graphed result and see the objects from the database that are related to that result via predefined relationships.

In some cases, it is possible to create more detailed visualizations, for example, by manually constructing a diagram, using a drawing software program, and/or writing special-purpose software to obtain a particular set of data and layout a graph. For example, a software program such as Visio, provided by Microsoft Corporation of Redmond Wash., may enable a user to manually lay out a graph of objects with object labels populated with data from a data source, such as a database. There are also products that provide database graphing and report generation facilities.

However, existing solutions may fail to enable a user to easily explore the structure of the data in relational database, including following particular items of data and/or comparing various branching pathways throughout various tables in a database or set of databases.

BRIEF DESCRIPTION OF THE DRAWINGS

FIG. 13 illustrates a conceptual reusable parametric query visualization graph in accordance with one embodiment.

DESCRIPTION

Figure 1:
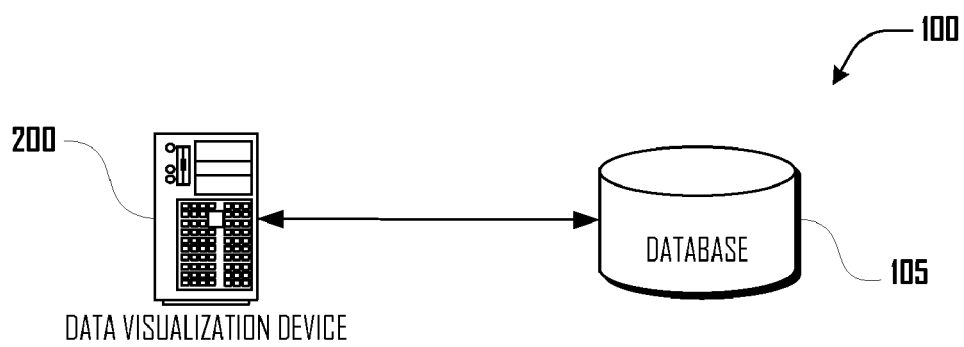
FIG. 1 is a system diagram showing a number of interconnected devices in accordance with one embodiment.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file servers, computer servers, and/or memory storage devices. Each of these conventional distributed computing components is accessible by the processor via a communication network.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Various embodiments of a data visualization system, as disclosed herein, may display data from a database as a visualization graph of parametric query nodes and links. In one embodiment, instances of reusable query objects specify result nodes in the visualization graph, and instances of linkage objects specify links between query instances in the result graph. In some embodiments, each node in the visualization graph may be an instance of a unique query object. In other embodiments, more than one node may be an instance of a single query object. Similarly, linkage instances in the result graph may or may not share linkage objects.

For example, FIG. 13 conceptually illustrates a visualization graph 1300 in accordance with one embodiment. Nodes in graph 1300 are query instances 1301-1306, and edges in graph 1300 are linkages 1310-1314.

Each of query instances 1301-1306 is an instance of a particular reusable query object (not shown). Every query object comprises a query specification (either parametric or complete) and one or more identified output columns. A complete query specification represents a database query that is fully defined and may be executed without additional data. For example, a complete query specification might represent a query such as "SELECT FOO FROM BAR WHERE BAT=3". A query object having a complete query specification is referred to herein as a "static query," and instances thereof are referred to as "static query instances." For example, static query instance 1306 includes a complete query specification 1327, which can be executed as-is to obtain result rows 1331.

By contrast, a parametric query specification includes one or more input parameters. For example, a parametric query specification might represent a query such as "SELECT FOO FROM BAR WHERE BAT=[-]", where [-] indicates an input parameter, whose value must be supplied from a linkage or from another source before the query can be executed. A query object having a parametric query specification is referred to herein as a "parametric query," and instances thereof are referred to as "parametric query instances." Query instances 1301-1305 are parametric query instances.

In some cases, a parametric query instance may obtain a literal value for an input parameter. Some embodiments may provide a graphical control (not shown, but see FIG. 8, discussed below) with which a user may type, select, or otherwise enter a number or string to be provided as an input parameter to a parametric query instance. The parametric query instance may then substitute the provided number or string for the input parameter in the parametric query specification and execute the query. For example, parametric query instance 1301 obtains literal value 1360 for input parameter 1320 to complete parametric query specification 1325, which can then be executed to obtain result rows 1330.

More pertinently, in other cases, a parametric query instance may obtain a value for an input parameter via a linkage, such as linkages 1310-1314. Put simply, a linkage maps an output column of a source query object (which may be a static query or a parametric query) directly to an input parameter of a destination query object (which can only be a parametric query). For example, parametric query instance 1302 obtains a value for input parameter 1321 via linkage 1312 from result field 1350 of static query instance 1306, and parametric query instance 1302 obtains a value for input parameter 1322 via linkage 1311 from result field 1351 of static query instance 1301. Using the provided values, parametric query specification 1326 can be completed and executed to obtain result rows 1332. Similarly, linkages 1310 and 1313-1314 respectively provide values from fields 1354 and 1352-1353 to input parameters (not shown) of parametric query instances 1303-1305.

In some cases, reusable linkage objects may be defined and individually instantiated for each linked query instance pair. For example, linkages 1313 and 1314 may be individual instantiations of the same reusable linkage object (not shown). In other cases, singleton linkages may be defined for a particular linked query instance pair.

Thus, visualization graph 1300, with its query instance nodes and linkage edges, may provide a visualization of relationships between various data records. A visualized data record may come from a single table, from multiple tables, and/or from tables in multiple databases. There are typically many relationships between data records in a database, and various embodiments may facilitate flexible selection of particular relationships for exploration and/or visualization.

In some embodiments of a data visualization system, an icon-based and/or point-and-click mechanism may enable a user to identify, visualize, and/or explore data relationships of interest without requiring the user to read or write Structured Query Language ("SQL") or other textual database computer language.

FIG. 1 illustrates a number of interconnected devices in accordance with one embodiment. Data visualization device 200 is connected to one or more local and/or remote databases 105. In various embodiments, database 105 may comprise a database management system ("DBMS"). In an exemplary embodiment, database 105 may comprise a relational database management system ("RDBMS") database such as Oracle Database, provided by Oracle Corporation of Redwood Shores California; Microsoft SQL Server, provided by Microsoft Corporation of Redmond Wash.; MySQL provided by MySQL AB of Uppsala Sweden and Cupertino California; and the like. In other embodiments, alternate DBMS may also be used, such as an object database ("ODBMS"), column-oriented DBMS, correlation database DBMS, and the like.

Figure 2:
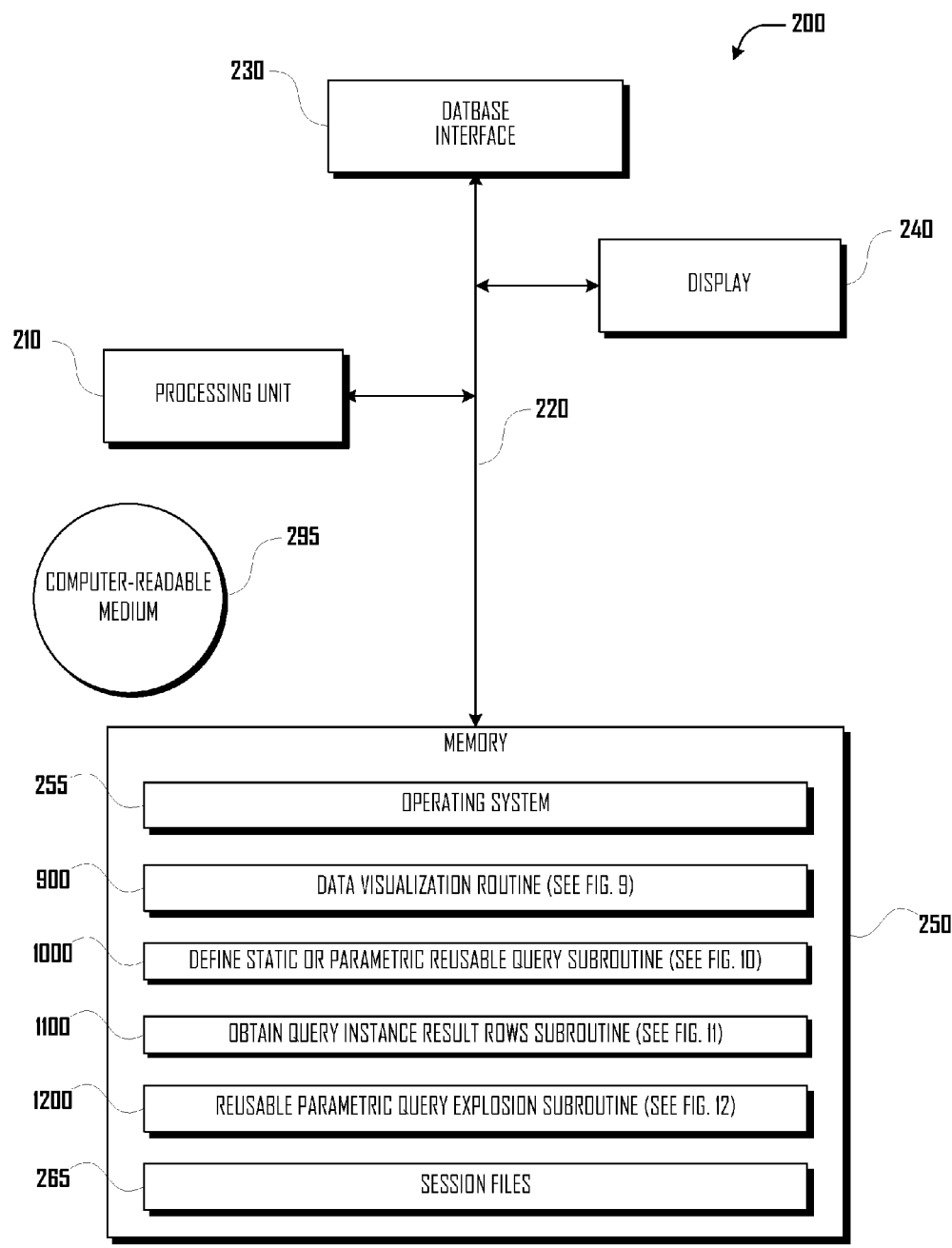
FIG. 2 is a block diagram of a device that provides an exemplary operating environment for various embodiments.

FIG. 2 illustrates several components of an exemplary data visualization device 200. In some embodiments, data visualization device 200 may include many more components than those shown in FIG. 2. However, it is not necessary that all of these generally conventional components be shown in order to disclose an illustrative embodiment. As shown in FIG. 2, data visualization device 200 includes a database interface 230 for connecting to database 105. Database interface 230 includes the necessary circuitry, drivers, authentication credentials, and/or program code for such a connection and is constructed for use with an appropriate protocol. In some embodiments, database interface 230 may comprise a network interface.

Data visualization device 200 also includes a processing unit 210, a memory 250, and a display 240, all interconnected, along with database interface 230, via bus 220. Memory 250 generally comprises a random access memory ("RAM"), a read only memory ("ROM"), and/or a permanent mass storage device, such as a disk drive. Memory 250 stores program code for reusable parametric query visualization routine 900, reusable static or parametric query definition subroutine 1000, query instance execution subroutine 1100, and reusable parametric query explosion subroutine 1200. In addition, memory 250 also stores an operating system 255.

In some embodiments, memory 250 also includes one or more session files 265, which may be used to save a user's work. In one embodiment, a saved session may be organized into one or more files contained in a directory. Some embodiments may provide a user interface for managing, sharing, and/or reusing queries, linkages, and/or result graphs stored in a session file or files.

These and other software components may be loaded from a computer readable storage medium 295 into memory 250 of data visualization device 200 using a drive mechanism (not shown) associated with a non-transient computer readable storage medium 295, such as a floppy disc, tape, DVD/CD-ROM and other optical media, memory card, and the like. In some embodiments, software components may also be loaded via a network interface (not shown) or other non-storage media.

Figure 3:
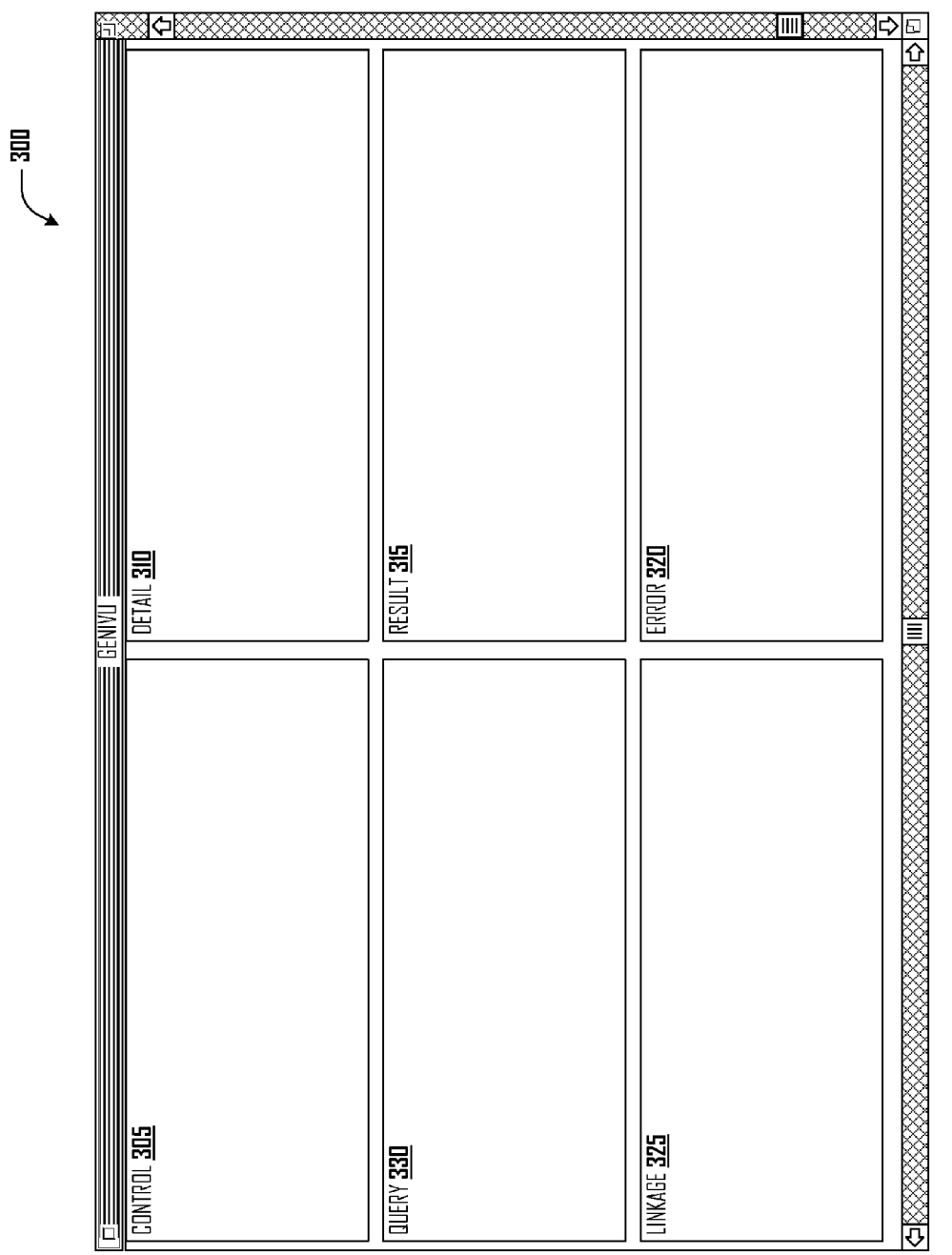
FIG. 3 illustrates an exemplary data visualization user interface in accordance with one embodiment.

FIG. 3 illustrates an exemplary data visualization user interface 300 in accordance with one embodiment. Data visualization user interface 300 includes control pane 305, which in some embodiments may display a list of object types, objects, and the like. In one embodiment. detail pane 310 may display details related to the active object, as well as a field to enter notes, a description, and/or other information associated with the active object.

Data visualization user interface 300 also includes error pane 320, which in one embodiment, displays a descriptive list of errors that may have occurred (if any). In some embodiments, when an error-causing condition is corrected, the corresponding error display may be removed.

Figure 4:
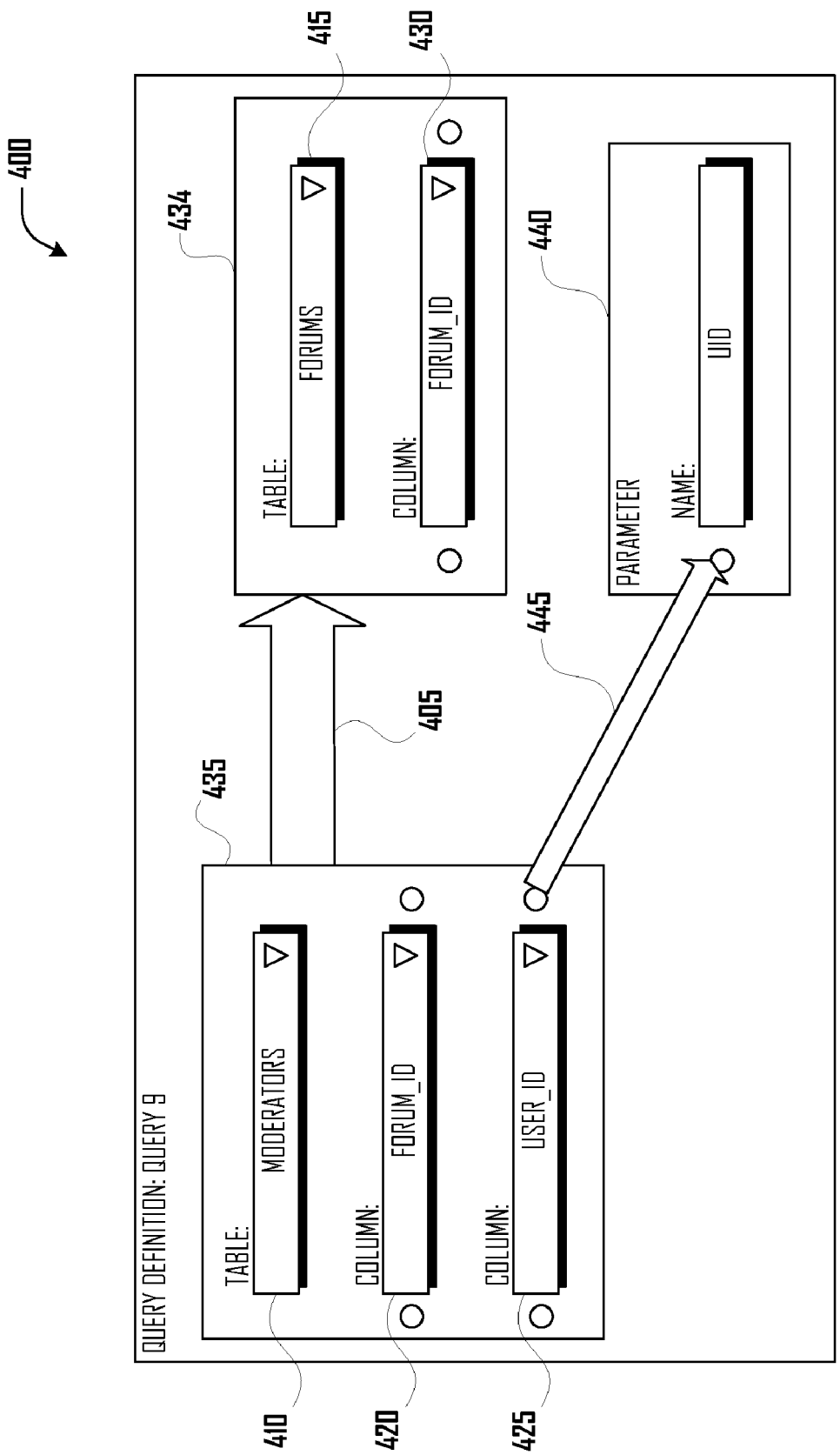
FIG. 4 illustrates an exemplary query pane user interface in accordance with one embodiment.
Figure 5:
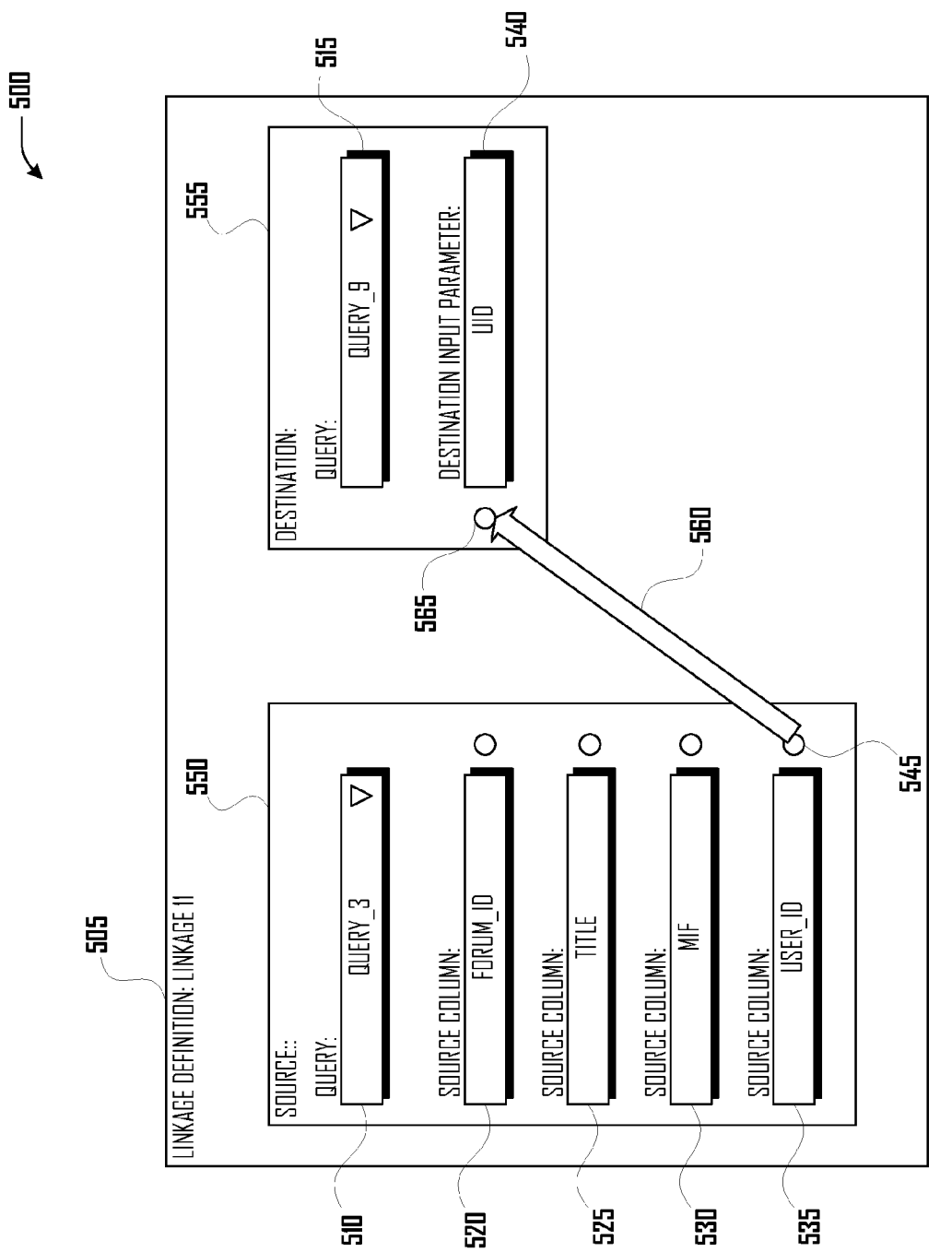
FIG. 5 illustrates an exemplary linkage pane user interface in accordance with one embodiment.
Figure 8:
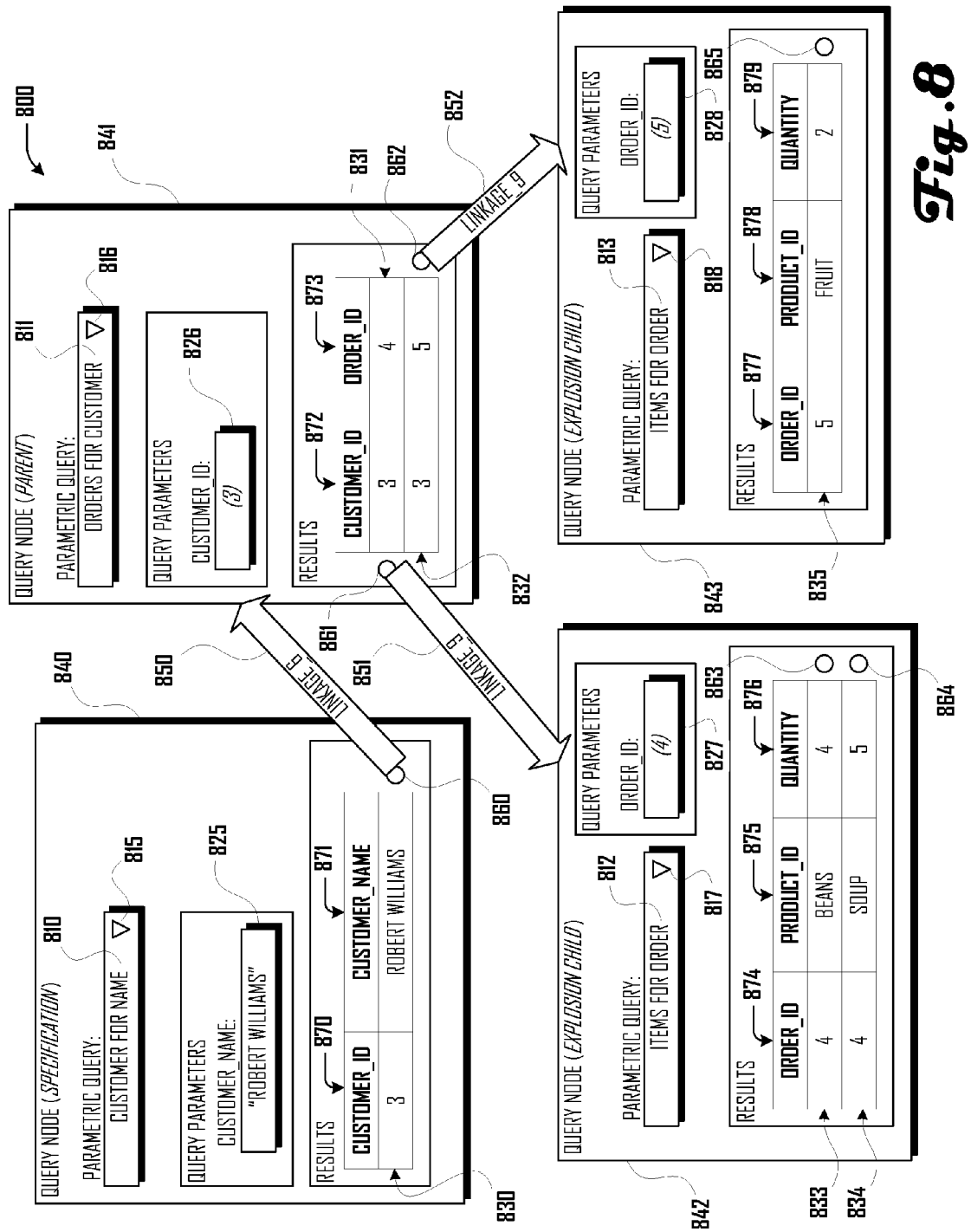
FIG. 8 illustrates an exemplary visualization graph in accordance with one embodiment.

Data visualization user interface 300 includes query pane 330. An exemplary query pane is illustrated in FIG. 4 and discussed below in greater detail. Data visualization user interface 300 includes linkage pane 325. An exemplary linkage pane is illustrated in FIG. 5 and discussed below in greater detail. Data visualization user interface 300 also includes result pane 315. An exemplary result pane is illustrated in FIG. 8 and discussed below in greater detail.

FIG. 4 illustrates an exemplary query pane user interface 400 in accordance with one embodiment. In some embodiments, a query pane may display a graph with two kinds of vertices: table vertices (e.g., vertices 434, 435) and parameter vertices (e.g. vertex 440). The displayed query graph may visually indicate a complete or partial query specification of a reusable static or parametric query.

For example, the illustrated query pane 400 includes table vertices 434 and 435, each of which includes a table control 410, 415 by which a user may specify which database table(s) the reusable parametric query will access (e.g. from database 105). Table vertices 434, 435 also include one or more column controls 420, 425, 430, from which a user may select one or more columns to be retrieved (e.g. from database 105) when the query is run.

In one embodiment, a query graph that includes more than one table vertex (e.g., vertices 434, 435) represents a query specification including a JOIN operation. In one embodiment, such a join operation is visually indicated via a join control 405 connecting table nodes 434 and 435. In one embodiment, an inner join is performed by default, but a user may specify alternate joins using a join definition user interface (not shown).

In one embodiment, table vertices 434, 435 may also include one or more "nickname" fields (not shown), by which a user may provide descriptive names for tables and/or columns. In some embodiments, a query object may further comprise formatting information for columns of data returned by the query. In some embodiments, a query object may further comprise default query and/or linkage information to facilitate explosion operations, as discussed below.

Query pane 400 also includes a parameter vertex 440. In one embodiment, parameter vertices specify which rows from the indicated table(s) will be included in the result graph. In one embodiment, a user can enter a static literal value, such as a customer number, into a parameter vertex 440. The user may further create a parameter link 445 to connect the parameter node (e.g. 440) to one of the indicated columns (e.g. 425). In one embodiment, a parameter link 445 represents by default an Equals condition between the columns, but a user may select other relations conditions using a parameter definition user interface (not shown).

In some embodiments, in addition to merely holding a static value, parameter vertex 440 can also hold an arbitrary query language statement. In other embodiments, parameter vertex 440 can represent an "input parameter." As discussed above, an input parameter stands in place of a value that is required by a partial query specification to return a value. In various embodiments, a user can provide a static literal parameter value in a visualization graph, and/or a parameter value can be obtained from another query node.

FIG. 5 illustrates an exemplary linkage pane user interface 500 in accordance with one embodiment. In one embodiment, linkage definition interface 505 defines or maps how to pass selected values from the result column of a particular source query (indicated by source query control 550) to a particular input parameter of a particular destination query (indicated by destination query control 555). In some embodiments, when a user creates a new linkage, one or both of the query controls 510, 515 may be pre-populated with contextually-determined likely query identifiers. If the pre-populated query identifiers are not what the user intended, he or she may select other queries using query controls 510, 515.

In some embodiments, a linkage 505 could define more than one source query to support gathering values from multiple source results. In some embodiments, a defined linkage may be re-used in many different places in a result graph.

Source query control 550 displays one or more source query output columns 520, 525, 530, 535, one or more of which may be used as data sources for an input parameter of the selected destination query 555. Similarly, destination query control 555 displays one or more input parameters 540 of the selected destination query. To complete the linkage specification, a user uses a link control 560 to specify a source output column 535 and a destination input parameter 540. In one embodiment, link control 560 may be created by dragging with a pointing device from a source column drag source 545 to a destination column drag sink 565. Alternatively, in some embodiments, the user may enter a value for some or all destination query parameters 540.

In some embodiments, a user may further specify an operation to be performed with data passing via the defined linkage. For example, a user may specify that data passing via a linkage be converted from one unit of measure to another and/or be tested for a validity condition. In some embodiments, a linkage may further be specified to warn a user if, for example, the linked source result values are not appropriate for the destination query parameter.

Figure 6:
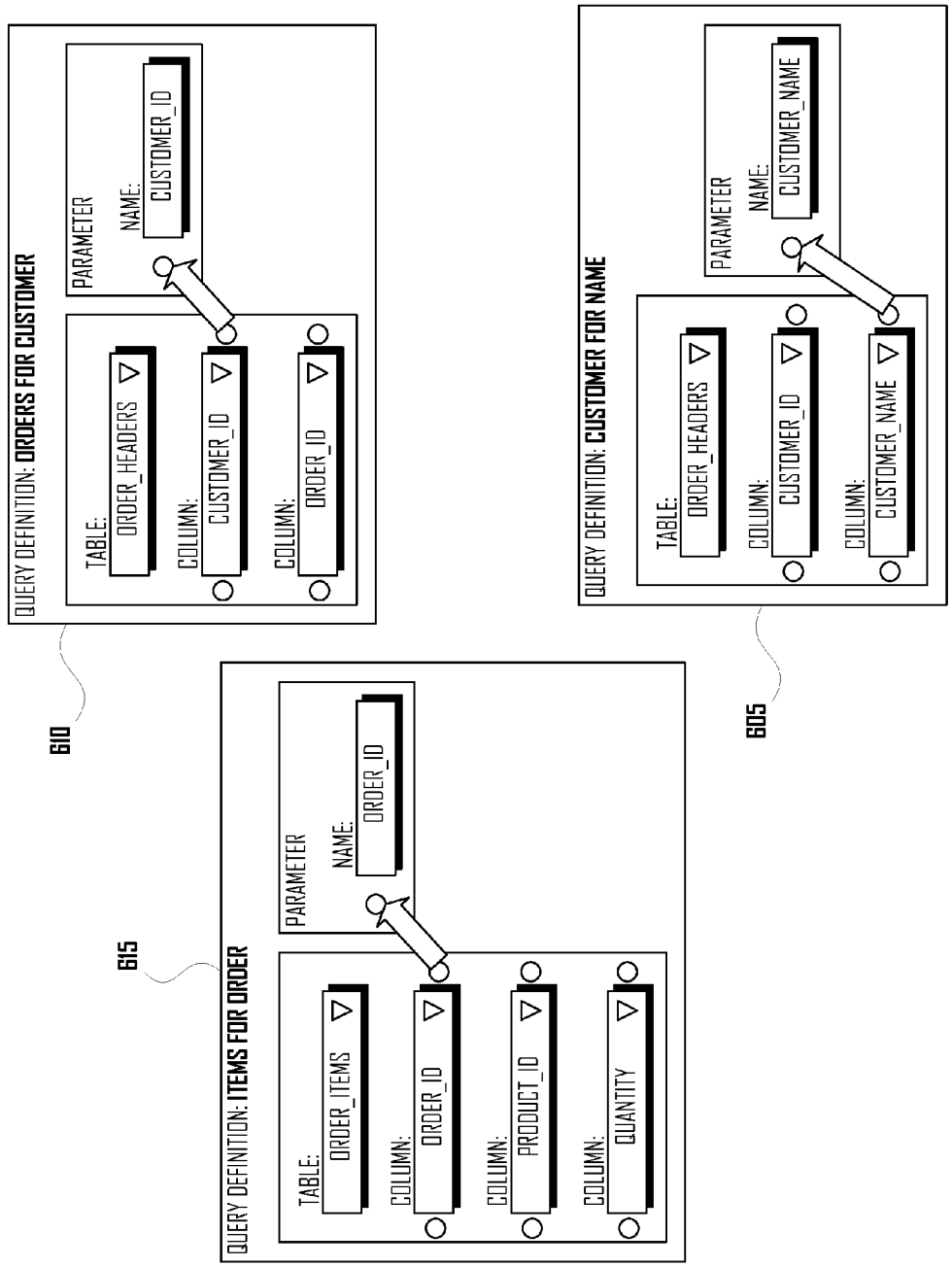
FIG. 6 illustrates a number of exemplary queries in accordance with one embodiment.
Figure 7:
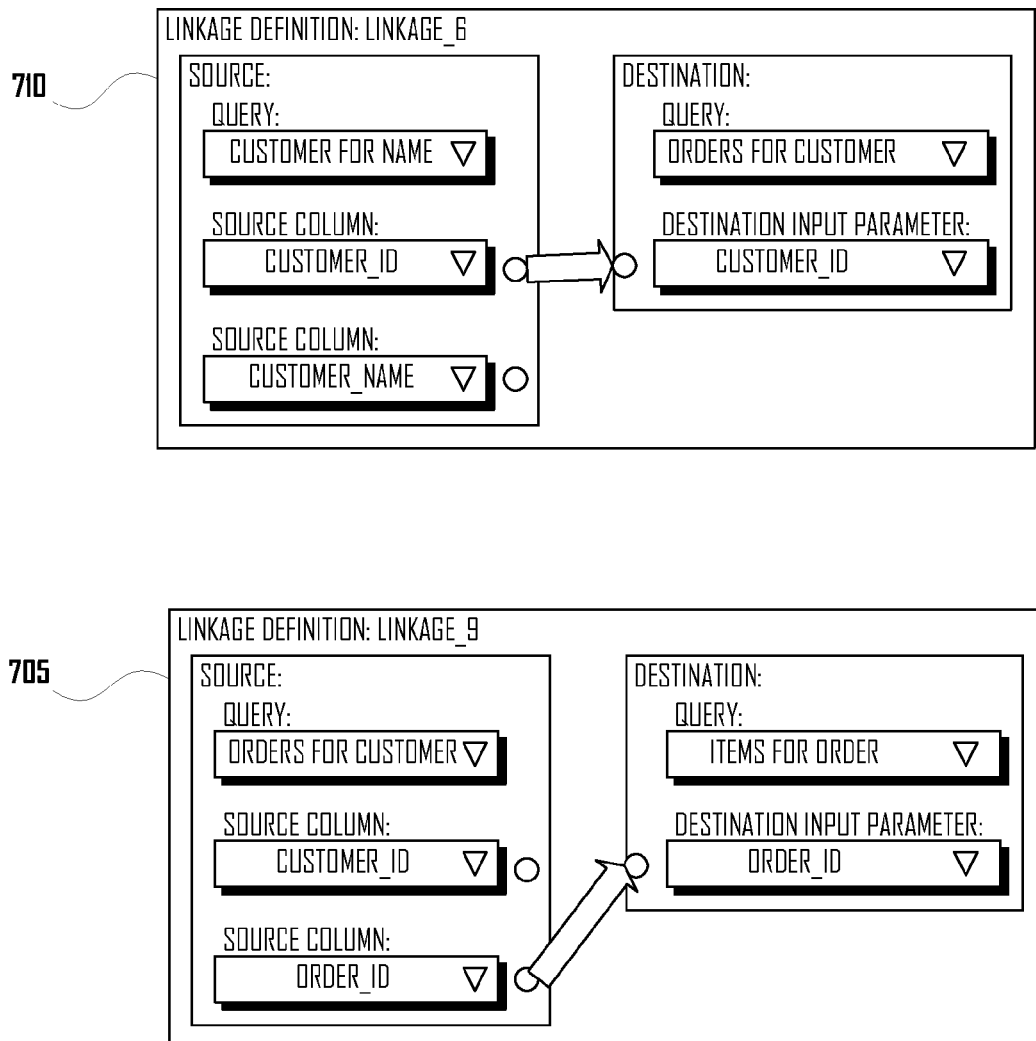
FIG. 7 illustrates a number of exemplary linkages in accordance with one embodiment.

FIG. 6 illustrates query definition panes 605, 610, 615 corresponding to parametric query instances illustrated in FIG. 8. FIG. 7 illustrates linkage definition panes 705, 710 corresponding to linkages illustrated in FIG. 8.

FIG. 8 illustrates an exemplary visualization graph 800, such as may be displayed in result pane 315, in accordance with one embodiment. In the illustrated embodiment, objects defined in query definition panes 605, 610, 615 and linkage definition panes 705, 710 provide information necessary to obtain a visualization graph 800. In some embodiments, visualization graph 800 comprises one or more query nodes 840-843 connected by linkages indicated by linkage controls 850-852. Each of query nodes 840-843 corresponds to an instance of a parametric query (see query definition panes 605, 610, 615, illustrated in FIG. 6).

Figure 12:
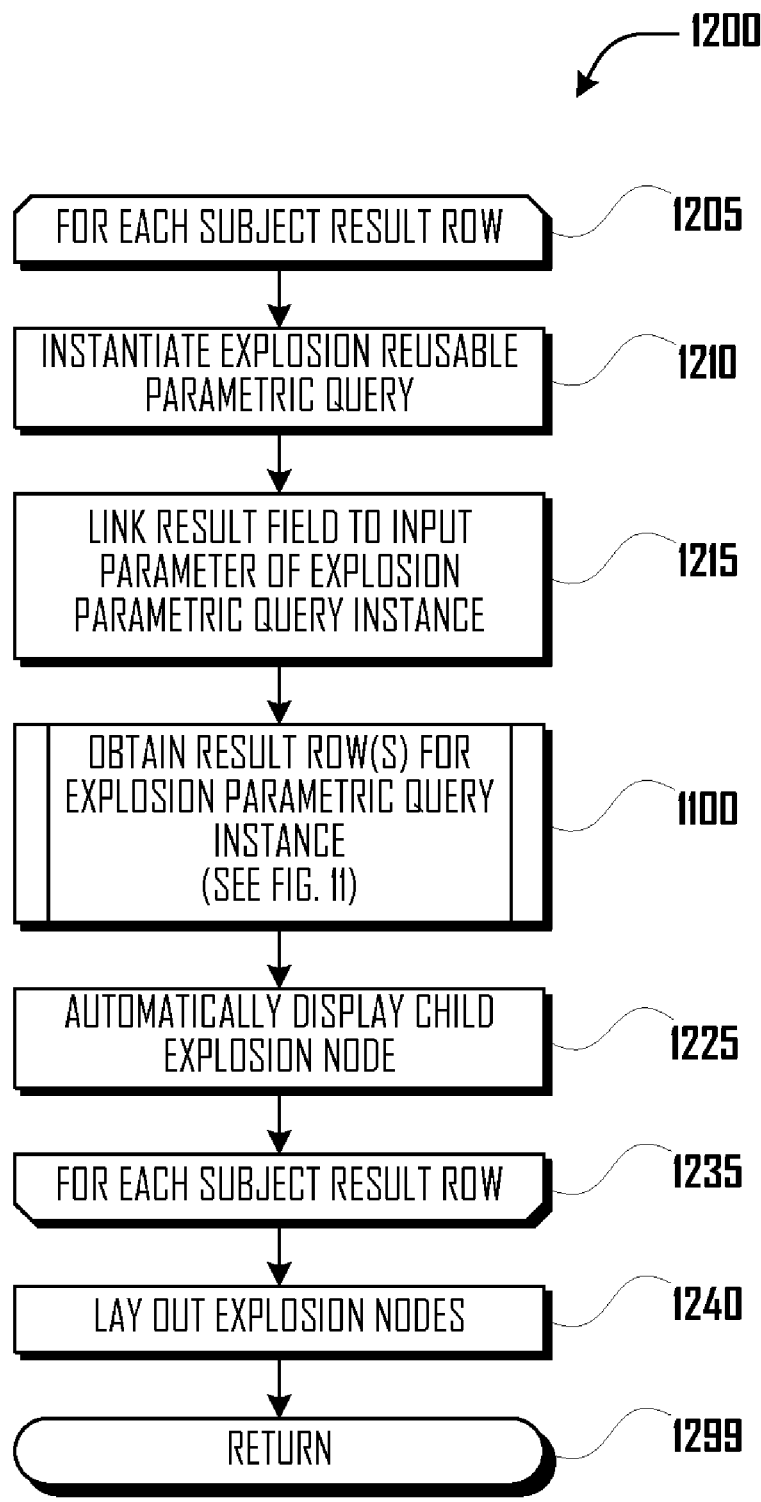
FIG. 12 illustrates an exemplary query explosion subroutine in accordance with one embodiment.

In the illustrated visualization graph 800, query nodes 840-843 are labeled with parenthetical descriptive identifiers merely to help clarify the description of visualization graph 800. For example, query node 841 is parenthetically identified as a "parent" node, which reflects its relationship to the "explosion child" nodes 842-843. (In some embodiments, an "explosion" routine, e.g. routine 1200 as illustrated in FIG. 12 and discussed below, may automatically create "explosion child" nodes such as nodes 842-843.) Similarly, query node 840 is parenthetically identified as a "specification" node, which reflects its relationship to "parent" node 841 (namely that result field 855 provides a value for input parameter 826 of node 841, thereby completing the specification of parametric query 811). However, these descriptive identifiers do not limit the functional roles that may be played by nodes 840-

843. For example, via further linkage and/or explosion operations (not shown), "child" nodes 843 and/or 843 could further function as "parent" nodes to one or more explosion children nodes (not shown).

In the illustrated embodiment, query nodes 840-843 include graphical query selection controls 815-818, by which a user can select a static or parametric query to instantiate for the node via a query selection interface (not shown, e.g., a drop-down menu, text entry field, or the like). As illustrated in FIG. 8, node 840 corresponds to an instance of parametric query 810, node 841 corresponds to an instance of parametric query 811, node 842 corresponds to an instance of parametric query 812, and node 843 corresponds to an instance of parametric query 813. In one embodiment, when a new static or parametric query is selected for a given node, visualization graph 800 may automatically update to reflect the new query selection.

In the illustrated embodiment, query nodes 840-843 include graphical input parameter controls 825-828, by which a user can specify one or more values for the node's parametric query instance. For example, using graphical input parameter control 825, a user has specified a literal string value ("Robert Williams") for the CUSTOMER_NAME input parameter of the parametric query instance to which node 840 corresponds. Values for the input parameters in nodes 841-843 are specified via linkages, which are graphically indicated by linkage controls 850-852, respectively. Therefore, in the illustrated embodiment, graphical input parameter controls 826-828 display the current value provided via the indicated linkage. In some embodiments, a user may indicate, define, and/or specify a linkage using a graphical connection control (e.g. connection controls 860-865) corresponding to a result row. Once a linkage has been specified, in some embodiments, a user may edit and/or change a linkage using an interface (not shown) accessed via linkage controls 850-852.

For a node corresponding to a parametric query node (e.g. nodes 840-843), result rows (e.g. result rows 830-835) can be obtained once values are provided for all of the parametric query instance's input parameters to complete the instance's partial query specification. Each result row (e.g. result rows 830-835) includes one or more values for one or more fields corresponding to one or more output columns (e.g. output columns 870-879) defined in the corresponding static or parametric query. In other embodiments, a node may graphically depict is result rows in a non-tabular format.

In various embodiments, visualization graph 800 and/or any of nodes 840-843 may include additional controls (not shown). For example, In one embodiment, a graphical node may include one or more display/hide controls (not shown) to enable a user to selectively determine how much information is displayed in the node, which may enable to user to hide details that he or she does not wish to focus on and/or to save space in visualization graph 800.

Thus, as illustrated in FIGS. 3-8 and discussed above, various embodiments may be utilized to generate visualization graphs from database records. Concomitantly, various user interface tools may facilitate providing correct data to queries and interchanging various queries, parameters, and/or linkages to enable a user to interactively investigate and/or explore structured data.

Figure 9:
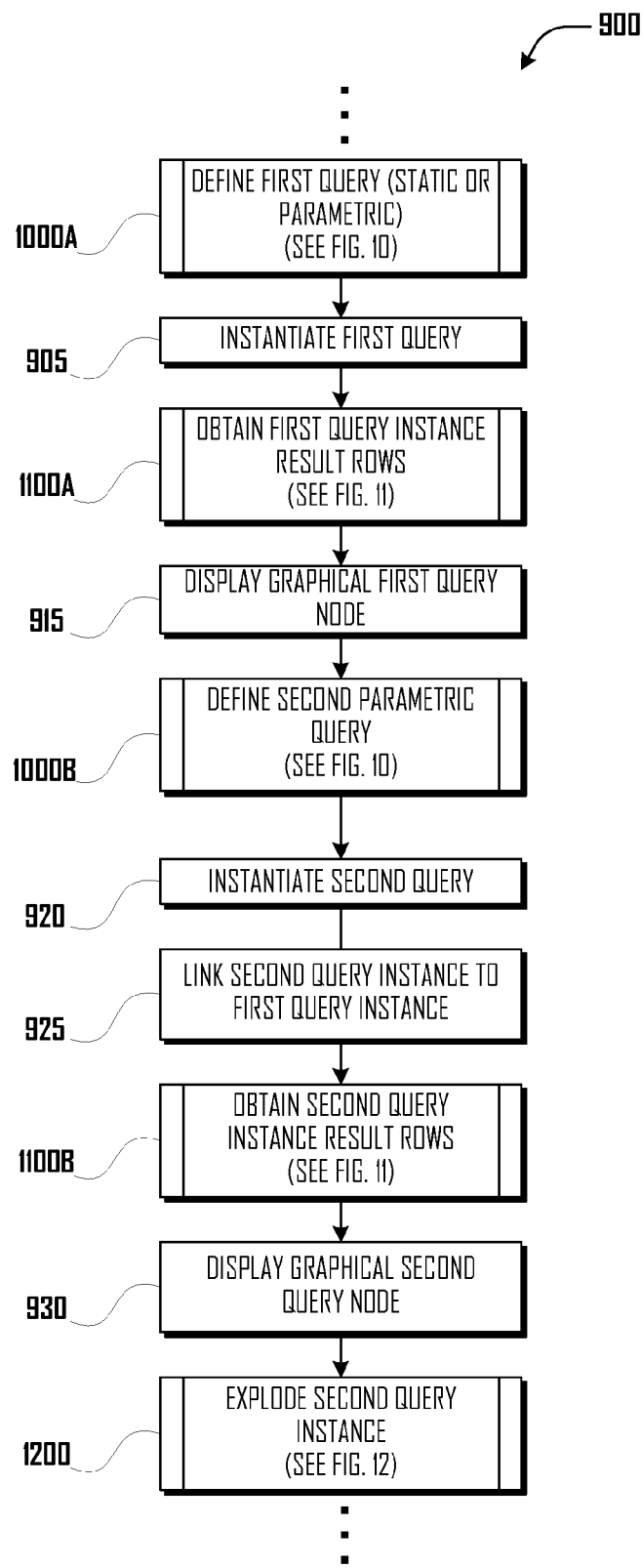
FIG. 9 illustrates an exemplary data visualization routine in accordance with one embodiment.

FIG. 9 illustrates one possible exemplary flow of a portion of a visualization routine 900, such as may be used to create a visualization graph (e.g. graph 800) in accordance with one embodiment. In various embodiments, the illustrated steps may be performed in a different order than indicated and/or similar steps may be added (or omitted), according to directions received from a user.

Figure 10:
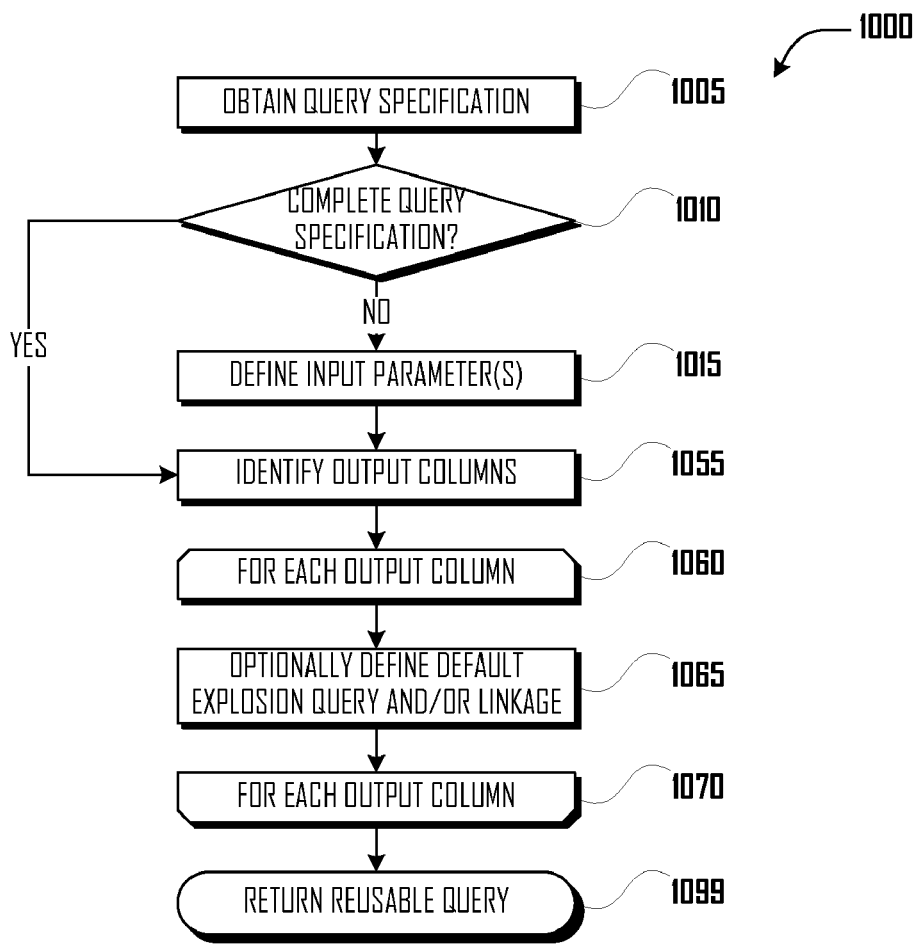
FIG. 10 illustrates an exemplary reusable static or parametric query definition subroutine in accordance with one embodiment.

In subroutine block 1000A, routine 900 defines a first static or parametric query according to subroutine 1000 (see FIG. 10). In block 905, routine creates an instance of the first static or parametric query. In subroutine block 1100A, routine 900 obtains one or more result rows for the first static or parametric query instance according to subroutine 1100 (see FIG. 11). In block 915, routine 900 displays a graphical query node corresponding to the first static or parametric query instance. For example, in block 915, routine 900 may display a query node such as node 840 in FIG. 8, discussed above.

In subroutine block 1000B, routine 900 defines a second parametric query according to subroutine 1000 (see FIG. 10, discussed below). In block 905, routine 900 creates an instance of the second parametric query. In block 925, routine 900 links an input parameter of the second parametric query instance to an output column of the first static or parametric query instance. In some embodiments, linking these query instances may include defining and instantiating a reusable linkage object mapping an input parameter of the second parametric query to an output column of the first static or parametric query.

In subroutine block 1100B, routine 900 obtains one or more result rows for the second parametric query instance according to subroutine 1100 (see FIG. 11, discussed below). In block 930, routine 900 displays a graphical query node corresponding to the second parametric query instance. For example, in block 930, routine 900 may display a query node such as node 841 in FIG. 8, discussed above. In some embodiments, routine 900 may also display a linkage control, such as linkage control 850 (see FIG. 8, discussed above), indicating the link between the input parameter of the second parametric query instance and the output column of the first static or parametric query instance.

In block 1200, routine 900 performs an explosion routine, such as routine 1200, illustrated in FIG. 12 and discussed below, to automatically create "child" or "explosion" nodes corresponding to the one or more result rows for the second parametric query instance obtained in block 1100B. For example, in block 1200, routine 900 may automatically create and display one or more explosion query nodes, such as nodes 842-843 in FIG. 8, discussed above. In some embodiments, routine 900 may also automatically display one or more linkage controls, such as linkage controls 851-852 (see FIG. 8, discussed above), indicating the link between explosion query nodes and the second parametric query node. In various embodiments, the user may continue drilling down into the data thus revealed and/or may otherwise continue to explore the data.

FIG. 10 illustrates an exemplary subroutine 1000 for defining a reusable static or parametric query in accordance with one embodiment. The blocks illustrated in FIG. 10 represent one possible sequence of operations comprising subroutine 1000, presented herein for clarity. However, in many embodiments, some or all of the illustrated operations may take place out of the illustrated sequence, possibly in response to directions from a user.

In block 1005, subroutine 1000 obtains a query specification for the reusable static or parametric query object being defined. For example, in one embodiment, a graphical query definition pane such as pane 400 (see FIG. 4, discussed above) may be employed to obtain the query specification.

In decision block 1010, subroutine 1000 determines whether the obtained query specification is complete or partial. As discussed above, a complete query specification represents a database query that is fully defined and may be executed without additional data. If the obtained query specification is complete, then the query object being defined is a static query specification, and routine 900 skips to block 1055, discussed below.

By contrast, a partial query specification requires one or more additional values before the query can be executed. If the obtained query specification is partial, then the query object being defined is a parametric query specification, and routine 900 proceeds to block 1015, in which one or more input parameters required to complete the partial query specification are defined. For example, in one embodiment, using a graphical query definition pane such as pane 400, a user may define an input parameter such as input parameter 440 (see FIG. 4, discussed above).

In block 1055, subroutine 1000 identifies output columns in the query specification. For example, in one embodiment, using a graphical query definition pane such as pane 400, output columns 420 and 425 may be identified (see FIG. 4, discussed above). Beginning in block 1060, subroutine 1000 processes each output column. In block 1065, subroutine 1000 optionally defines a default explosion query and/or default explosion linkage for the current output column. If no default is set for an output column, a user may be prompted to determine an appropriate linkage and/or query when an explosion operation is performed on an instance of the query object being defined. In ending loop block 1070, subroutine 1000 iterates back to block 1060 to process the next output column (if any). Subroutine 1000 ends in block 1099.

Figure 11:
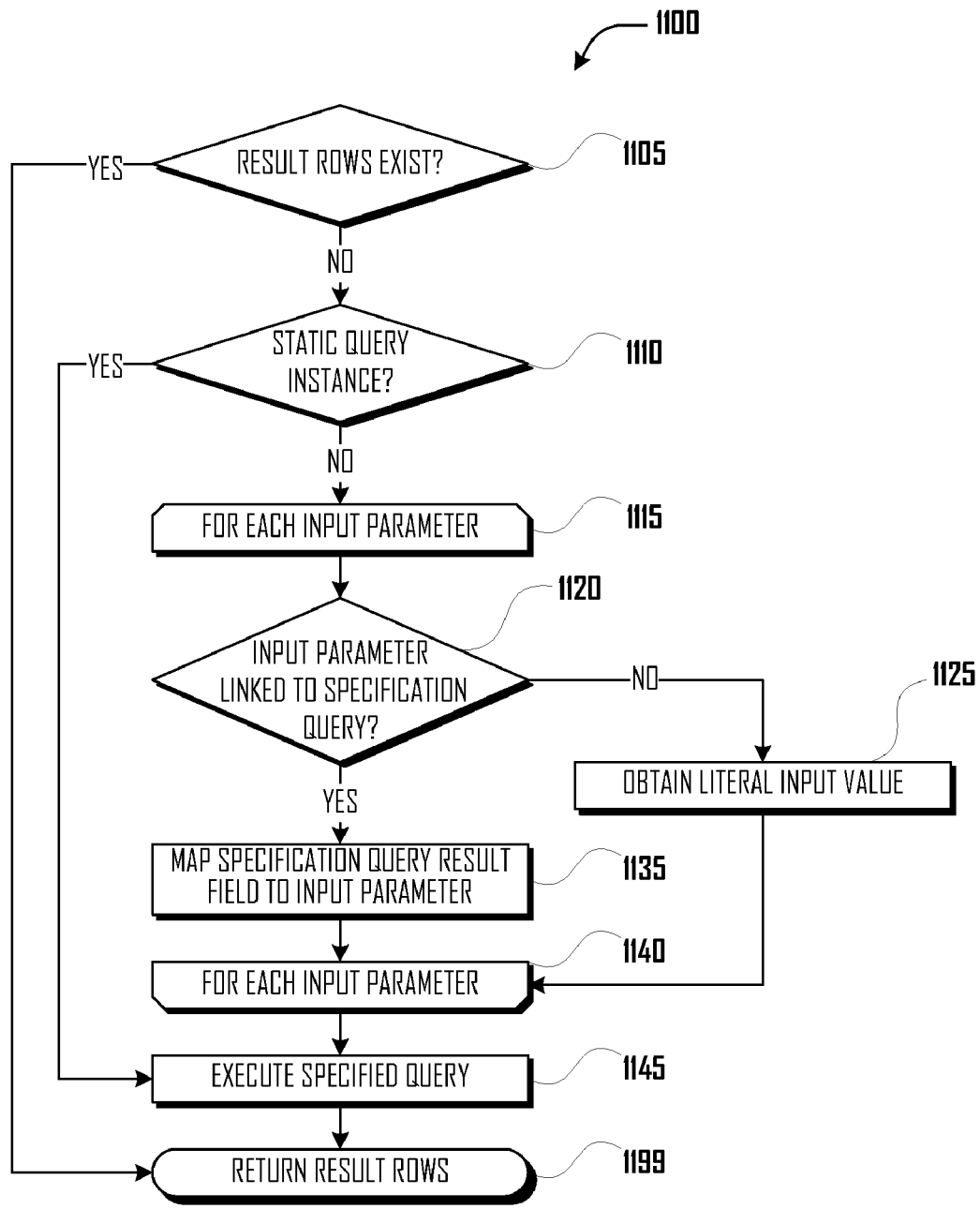
FIG. 11 illustrates an exemplary query instance execution subroutine in accordance with one embodiment.

FIG. 11 illustrates an exemplary execution subroutine 1100 for a subject query instance in accordance with one embodiment. In decision block 1105, subroutine 1100 determines whether a current set of result rows for the subject query instance already exist and/or have been cached. If so, subroutine 1100 skips to block 1199, returning the result rows. If not, in decision block 1110, subroutine 1100 determines whether the subject query instance is a static query instance. If so, subroutine 1100 skips to block 1145 to execute the static query instance's fully-specified or complete query.

If in decision block 1110, subroutine 1100 determines that the subject query instance is a parametric query instance, then beginning in loop block 1115, subroutine 1100 processes each of the subject query instance's input parameters.

In block 1120, subroutine 1100 determines whether the current input parameter is linked to a specification query instance, which will provide an input value according to one of its output fields. In some embodiments, this determination may involve prompting the user to provide a linkage or to provide a literal input value.

If in decision block 1120, subroutine 1100 determines that a value for the current input parameter is not provided by a link to a specification query instance, then in block 1125, subroutine 1100 obtains a literal value for the input parameter. For example, in some embodiments, subroutine 1100 may prompt the user to enter and/or select a literal value for the parameter.

On the other hand, if in decision block 1120, subroutine 1100 determines that a value for the current input parameter is to be provided by a link to a specification query instance, then in block 1135, subroutine 1100 obtains an input value from the linked field of the specification query instance. In some embodiments, obtaining such a linked value may include transforming the value in the linked field. For a simple example, the linked value may be transformed from one unit to another unit before being provided to the subject query instance as the current input parameter.

In ending loop block 1140, subroutine 1100 loops back to block 1115 to process the next input parameter (if any). Once all input parameters have been processed, the parametric query's partial query specification can be completed and executed to obtain a set of result rows, which are returned to the caller when subroutine 1100 ends in block 1199. In some embodiments, subroutine 1100 may additionally perform other operations, such as caching the result rows for re-use, for example.

FIG. 12 illustrates an exemplary subroutine 1200 for exploding a subject query instance in accordance with one embodiment. Beginning in loop block 1205, subroutine 1200 processes each result row of the subject query instance in turn. (It will be appreciated that in some embodiments, subroutine 1200 may only process a user-indicated subset of the result rows of the subject query instance.)

In block 1210, subroutine 1200 instantiates a determined "explosion" parametric query for use in the explosion operation. In some embodiments, the explosion parametric query may be identified by the subject query instance (or by its parent object) as a "default" explosion query. In other embodiments, the explosion parametric query may be identified by the subject query instance (or by its parent object) according to a "default" reusable linkage object, as discussed further below. Such a "default" assignments may allow the user to quickly expand and/or explore a tree data structure. In still other embodiments, the user may provide the explosion parametric query at explosion-time. In one embodiment, the explosion parametric query may be determined in accordance with a user-selected property associated with the subject query instance and/or the query object from which it was instantiated.

In some embodiments, the same explosion parametric query object may be instantiated for each subject result row. In other embodiments, different explosion parametric query objects may be instantiated for some or all of the subject result row.

In block 1215, subroutine 1200 links a result field of the explosion parametric query instance to an input parameter of the explosion parametric query instance. In some embodiments, a "default" linkage may be identified by the subject query instance (or by its parent object). In one embodiment, a linkage may be determined in accordance with a user-selected property associated with the subject query instance and/or the query object from which it was instantiated.

It will be appreciated that although subroutine 1200 illustrates a relatively simple explosion embodiment (for clarity of explanation), in which a single result field is linked to a single input parameter, more complex embodiments may involve a greater number of links and/or input parameters. In such embodiments, subroutine 1200 may be modified accordingly.

In subroutine block 1100, subroutine 1200 obtains one or more result rows for the explosion parametric query instance according to subroutine 1100, as illustrated in FIG. 11 and discussed above. In block 1225, subroutine 1200 automatically displays a "child explosion" node according to the explosion parametric query instance, the link established in block 1215, and the result rows obtained in subroutine block 1100. For example, referring to FIG. 8, discussed above, subroutine 1200 may display node 842 and linkage 851 on one iteration of block 1225, and may display node 843 and linkage 852 on a subsequent iteration of block 1225.

In ending loop block 1235, subroutine 1200 loops back to block 1205 to process the next subject result row (if any). In block 1240, subroutine 1200 automatically lays out the explosion nodes thus created. In some embodiments, the explosion nodes may be algorithmically laid out so that they do not overlap with existing nodes on a visualization graph. In other embodiments, some or all result nodes in a visualization graph may be rearranged when an explode operation is performed. In some embodiments, the user may be able to select a positioning configuration for the explosion nodes. For example, the user may select a configuration in which the explosion nodes are arranged vertically, horizontally, surrounding their parent result node, or the like. Additional details regarding automatic node layout may be found in Appendix B to this application.

In some embodiments, a set of explosion nodes may be "unexploded." In other words, some embodiments may provide a facility to automatically delete explosion nodes and/or their associated links.

In various embodiments, via a combination of explode and unexploded operations, a user may be able to essentially jump from node to node, changing queries as desired, to easily traverse a database structure.

An exploded tree structure may provide advantages over a tabular display that ordinarily results from a database query. Exemplary advantages may include some or all of the following:

- The user may be able to select which parts of the tree to expand, reducing the total amount of data displayed and/or highlighting important data.
- The user may be able to identify rows of interest in a complex dataset more quickly and with fewer errors than by crafting a query to explicitly select only rows of interest.
- An exploded tree display may highlight intermediate structures within the data that would otherwise be hidden in a tabular display. For example, a tabular display may hide the fact that many rows are coming from one or a few partial results.
- The linkage mechanism described herein may allow different queries to run on different databases, even if the databases do not support an equivalent cross-database Join.
- An exploded tree display may simplify and clarify logical relationships between pieces of data. By contrast, in a tabular display, intermediate table data values in a complex join are typically repeated many times.

In some embodiments, an explode operation may not create a new exploded result node if an existing node with the same values already exists. Instead, a link may be created to the pre-existing node. The resulting diagram may no longer be a tree, but a general graph. This may further allow the user to recognize a structure in the data that may not be readily apparent in a tabular presentation of the results.

In various embodiments, a data visualization system as disclosed herein may be used in some or all of the following exemplary scenarios:

Record lookup. A data visualization system as disclosed herein may be useful for prototyping, system development, and/or problem solving. For example, a user may be able to investigate related events (e.g., customer events, order events, and the like) even before production screens have been developed.

Understanding the data. A user may be able to easily follow a chain of thought to see various relationships in a database.

Constructing charts that present structured data. Such a chart may show the organization of the database along with data at each level of the database structure. Alternatively, the structure may be within a single table or group of tables. For example, a user may desire a diagram that shows how a series of states occurred, along with the event record that occurred between the states. A user could create a one-off chart with a drawing program, but it would likely require much tedious and error-prone manual data transfer. By contrast, a data visualization system as disclosed herein may reliably and easily create a chart that can be re-used and/or updated with new data at a later time.

Comparing the data in different databases. During system development, a user may wish to compare a complex series of related data items in different databases. Using one or more linkages, a user may be able to quickly generate result nodes showing related items from different databases.

Analyzing an application or process. There are several ways of documenting how an application or process is structured. a data visualization system as disclosed herein allows a user to build a diagram that shows the sequence of operations in an application and the data that is used at each step. For example, a user may enter a specific customer id at the initial step, for example, and see the rest of the diagram updated to show the data used at that part of the process. Each step can be labeled with a description and label, and the user may quickly navigate to that step be selecting from a list.

Although specific embodiments have been illustrated and described herein, a whole variety of alternate and/or equivalent implementations may be substituted for the specific embodiments shown and described without departing from the scope of the present disclosure. This application is intended to cover any adaptations or variations of the embodiments discussed herein.

The invention claimed is:

1. A computer-implemented method for visualizing the structure of data in a database via a plurality of reusable parametric queries and a plurality of graphical nodes at a visualization computer having a graphical user interface ("GUI"), each reusable parametric query comprising a partial query specification, an output field, and an input parameter, each graphical node corresponding to an instance of a reusable parametric query and comprising graphical controls corresponding to the partial query specification of the query instance, the input parameter of the query instance, and one or more result rows of the query instance, the method comprising:

defining, by the visualization computer, a child reusable parametric query and a parent reusable parametric query comprising a linkage indication indicating a reusable linkage linking the output field of said parent reusable parametric query to the input parameter of said child reusable parametric query;

obtaining, by the visualization computer, a parent-parameter value for the input parameter of an instance of said parent reusable parametric query ("parent instance"), said parent-parameter value completing the partial query specification of said parent instance;

executing, by the visualization computer, said parent instance according to said parent-parameter value to obtain a plurality of parent-result rows, each comprising a data element corresponding to the output field of said parent instance;

displaying in the GUI a parent graphical node corresponding to said parent instance; and for each of said plurality of parent-result rows, performing, by the visualization computer, an explosion operation comprising:

linking the output field of said parent reusable parametric query to the input parameter of said child reusable parametric query;

obtaining a child-parameter value according to the linked output field of the current parent-result row, said child-parameter value completing the partial query specification of said current child instance;

automatically executing said current child instance to obtain at least one child-result row; and displaying in the GUI a current-child graphical node corresponding to said current child instance, and a graphical linkage control indicating linkage between said current parent-result row and said current-child graphical node.

2. The method of claim 1, wherein obtaining said parent-parameter value comprises:

performing a specification query to obtain a specification-result row comprising a specification-result field; and linking said specification-result field to said parent input parameter of said parent reusable parametric query.

3. The method of claim 2, wherein said specification query comprises a reusable parametric query, the method further comprising displaying in said GUI a specification graphical node corresponding to said specification query.

4. The method of claim 3, wherein said specification graphical node is automatically created via said explosion operation.

5. The method of claim 2, wherein said specification query comprises a reusable parametric query whose input parameter comprises literal data obtained via said GUI.

6. The method of claim 1, wherein said explosion operation further comprises automatically laying out said child node with respect to its peer nodes in said GUI 7. A computing apparatus comprising a graphical user interface ("GUI"), a processor, and a memory having stored thereon instructions that when executed by the processor, perform a method for visualizing the structure of data in a database via a plurality of reusable parametric queries and a plurality of graphical nodes, each reusable parametric query comprising a partial query specification, an output field, and an input parameter, each graphical node corresponding to an instance of a reusable parametric query and comprising graphical controls corresponding to the partial query specification of the query instance, the input parameter of the query instance, and one or more result rows of the query instance, the method comprising:

defining a child reusable parametric query and a parent reusable parametric query comprising a linkage indication indicating a reusable linkage linking the output field of said parent reusable parametric query to the input parameter of said child reusable parametric query;

obtaining a parent-parameter value for the input parameter of an instance of said parent reusable parametric query ("parent instance"), said parent-parameter value completing the partial query specification of said parent instance;

executing said parent instance according to said parent-parameter value to obtain a plurality of parent-result rows, each comprising a data element corresponding to the output field of said parent instance;

displaying in the GUI a parent graphical node corresponding to said parent instance; and for each of said plurality of parent-result rows, performing an explosion operation comprising:

linking the output field of said parent reusable parametric query to the input parameter of said child reusable parametric query;

obtaining a child-parameter value according to the linked output field of the current parent-result row, said child-parameter value completing the partial query specification of said current child instance;

automatically executing said current child instance to obtain at least one child-result row; and displaying in the GUI a current-child graphical node corresponding to said current child instance, and a graphical linkage control indicating linkage between said current parent-result row and said current-child graphical node.

8. The apparatus of claim 7, wherein obtaining said parent-parameter value comprises:

performing a specification query to obtain a specification-result row comprising a specification-result field; and linking said specification-result field to said parent input parameter of said parent reusable parametric query.

9. The apparatus of claim 8, wherein said specification query comprises a reusable parametric query, the method further comprising displaying in said GUI a specification graphical node corresponding to said specification query.

10. The apparatus of claim 9, wherein said specification graphical node is automatically created via said explosion operation.

11. The apparatus of claim 8, wherein said specification query comprises a reusable parametric query whose input parameter comprises literal data obtained via said GUI.

12. The apparatus of claim 7, wherein said explosion operation further comprises automatically laying out said child node with respect to its peer nodes in said GUI.

13. A non-transient computer-readable storage medium having stored thereon instructions that when executed by a processor, perform a method for visualizing the structure of data in a database via a plurality of reusable parametric queries and a plurality of graphical nodes, each reusable parametric query comprising a partial query specification, an output field, and an input parameter, each graphical node corresponding to an instance of a reusable parametric query and comprising graphical controls corresponding to the partial query specification of the query instance, the input parameter of the query instance, and one or more result rows of the query instance, the method comprising:

defining a child reusable parametric query and a parent reusable parametric query comprising a linkage indication indicating a reusable linkage linking the output field of said parent reusable parametric query to the input parameter of said child reusable parametric query;

obtaining a parent-parameter value for the input parameter of an instance of said parent reusable parametric query ("parent instance"), said parent-parameter value completing the partial query specification of said parent instance;

executing said parent instance according to said parent-parameter value to obtain a plurality of parent-result rows, each comprising a data element corresponding to the output field of said parent instance;

displaying in a graphical user interface ("GUI"), a parent graphical node corresponding to said parent instance; and for each of said plurality of parent-result rows, performing an explosion operation comprising:

linking the output field of said parent reusable parametric query to the input parameter of said child reusable parametric query;

obtaining a child-parameter value according to the linked output field of the current parent-result row, said child-parameter value completing the partial query specification of said current child instance;

automatically executing said current child instance to obtain at least one child-result row; and displaying in said GUI a current-child graphical node corresponding to said current child instance, and a graphical linkage control indicating linkage between said current parent-result row and said current-child graphical node.

14. The storage medium of claim 13, wherein obtaining said parent-parameter value comprises:

performing a specification query to obtain a specification-result row comprising a specification-result field; and linking said specification-result field to said parent input parameter of said parent reusable parametric query.

15. The storage medium of claim 14, wherein said specification query comprises a reusable parametric query, the method further comprising displaying in said GUI a specification graphical node corresponding to said specification query.

16. The storage medium of claim 15, wherein said specification graphical node is automatically created via said explosion operation.

17. The storage medium of claim 14, wherein said specification query comprises a reusable parametric query whose input parameter comprises literal data obtained via said GUI.

18. The storage medium of claim 13, wherein said explosion operation further comprises automatically laying out said child node with respect to its peer nodes in said GUI.

* * * * *